United States Patent [19]
Kakiuchi et al.

[11] Patent Number: 5,453,213
[45] Date of Patent: Sep. 26, 1995

[54] LATENT HEAT STORAGE MATERIAL CONTAINING $NA_2SO_4 \cdot 10H_2O$, $NH_4CL$, NACL AND $(NH_4)_2SO_4$

[75] Inventors: Hiroyuki Kakiuchi; Masahiro Oka, both of Yokkaichi, Japan

[73] Assignees: Mitsubishi Petrochemical Co., Ltd.; Mitsubishi Petrochemical Engineering Co., Ltd., both of Tokyo, Japan

[21] Appl. No.: 219,524

[22] Filed: Mar. 29, 1994

[30] Foreign Application Priority Data

Apr. 12, 1993 [JP] Japan .................................. 5-118908

[51] Int. Cl.⁶ .................................................. C09K 5/06
[52] U.S. Cl. ............................................ 252/70; 165/10
[58] Field of Search .................................. 252/70; 165/10

[56] References Cited

U.S. PATENT DOCUMENTS 3,986,969  10/1976  Telkes ............................ 252/70

FOREIGN PATENT DOCUMENTS

| 0141550 | 10/1984 | European Pat. Off. . |
|---|---|---|
| 57-153076 | 9/1982 | Japan . |
| 59-60197 | 4/1984 | Japan . |
| 59-113082 | 6/1984 | Japan . |
| 60-011575 | 1/1985 | Japan . |
| 60-8380 | 1/1985 | Japan . |
| 60-084379 | 5/1985 | Japan . |
| 61-019687 | 1/1986 | Japan . |
| 63-035683 | 2/1988 | Japan . |
| 2-092988 | 4/1990 | Japan . |

*Primary Examiner*—Christine Skane
*Attorney, Agent, or Firm*—Armstrong, Westerman, Hattori, McLeland and Naughton

[57] ABSTRACT

The present invention relates to a latent heat storage material composition comprising 70 to 90 wt % of sodium sulfate decahydrate, 3 to 17 wt % of ammonium chloride, 1 to 13 w % of sodium chloride and 1 to 13 wt % of ammonium sulfate. The composition can be frozen with cooled water of 4° to 5° C., has a melting point of 10° to 13° C., has large latent heat at the melting point and exhibits excellent long-term performance.

5 Claims, 1 Drawing Sheet

LATENT HEAT STORAGE MATERIAL CONTAINING $NA_2SO_4 \cdot 10H_2O$, $NH_4CL$, $NACL$ AND $(NH_4)_2SO_4$

BACKGROUND OF THE INVENTION

1. Field of the Invention

The present invention relates to a novel latent heat storage material composition suitable for use in air conditioning systems.

2. Description of the Prior Art

Heretofore, latent heat storage materials used in air conditioning systems which have melting points in the range of 5° to 10° C. have been considered useful. Examples of the known conventional organic compounds having melting points of around 5° to 10° C. include tetradecane ($C_{14}H_{30}$, melting point: 5° C.; Japanese Patent Publication No. 53-24182) and pentadecane ($C_{15}H_{32}$, melting point: 9.9° C.), etc., which are paraffinic compounds, and polyethyleneglycol #400 (melting point: 4° to 8° C.; Japanese Patent Application Laid-open No. 62-19968) and 1-decanol (melting point: 5° C.), etc., which are non-paraffinic compounds. However, these compounds are scarcely used now, as they have low thermal conductivity and a relatively low heat of melting.

On the other hand, several compositions of inorganic compounds have been reported which are composed of inorganic salt hydrates having large heat of melting and melting points of around 5° to 10° C. For example, a binary composition composed of disodium hydrogenphosphate dodecahydrate and dipotassium hydrogenphosphate hexahydrate (melting point: 5° C.; Japanese Patent Publication No. 52-11061) which has outstanding problems in the prevention of supercooling and, which therefore, has faced difficulties in practical use. A ternary composition composed of sodium sulfate decahydrate, ammonium chloride and ammonium bromide (Japanese Patent Publication No. 62-56912), which although it possesses a melting point of within the range of 6.3° to 10.1° C., is also not suitable for practical use because of its insufficient stability in long-term performance.

Another ternary composition composed of sodium sulfate decahydrate, ammonium chloride and sodium chloride is illustrated in Maria Telkes, SOLAR ENERGY STORAGE (ASHRAE JOURNAL, SEPTEMBER, 1974), but this composition has been known to have a melting point of 12.8° C. In addition, a ternary composition composed of sodium sulphate, water and ammonium chloride (Japanese Patent Application Laid-open No. 2-92988) has a melting point of within the range of 8.6° to 9.6° C. However, the freezing point of this composition is low (i.e. 3.8° to 4.6° C.) and, therefore, since the temperature of the cooled water used for freezing the composition is as low as about 1° to 2° C. it cannot be used in general purpose refrigerators.

The preferable melting point of latent heat storage materials used for air conditioning systems has been considered to be from 5° to 10° C., and more preferably from 5° to 8° C. However, when already installed air conditioning systems are used with insufficient cooling, a conventional water heat-pump (e.g. an absorption refrigerator) must also be used simultaneously. In this case, the possibility that the temperature of the obtained cooled water would be restricted to about 4° to 5° C. is great. The latent heat storage materials which are to be frozen by the cooled water of 4° to 5° C. should have freezing points of 7° to 8° C., and, from the view point that it is preferable to have a melting temperature which is as low as possible, the melting point of the latent heat storage materials should optimally be in the range of 10° to 13° C.

Accordingly, the object of the present invention is to provide a latent heat storage material composition suitable for use in air conditioning systems and satisfying conditions such as (1) freezing by cooled water of 4° to 5° C. and having a melting point in the range of 10° to 13° C., (2) having large latent heat at the melting point, and (3) exhibiting stability in long-term performance.

DETAILED DESCRIPTION OF THE INVENTION

Figure 1:
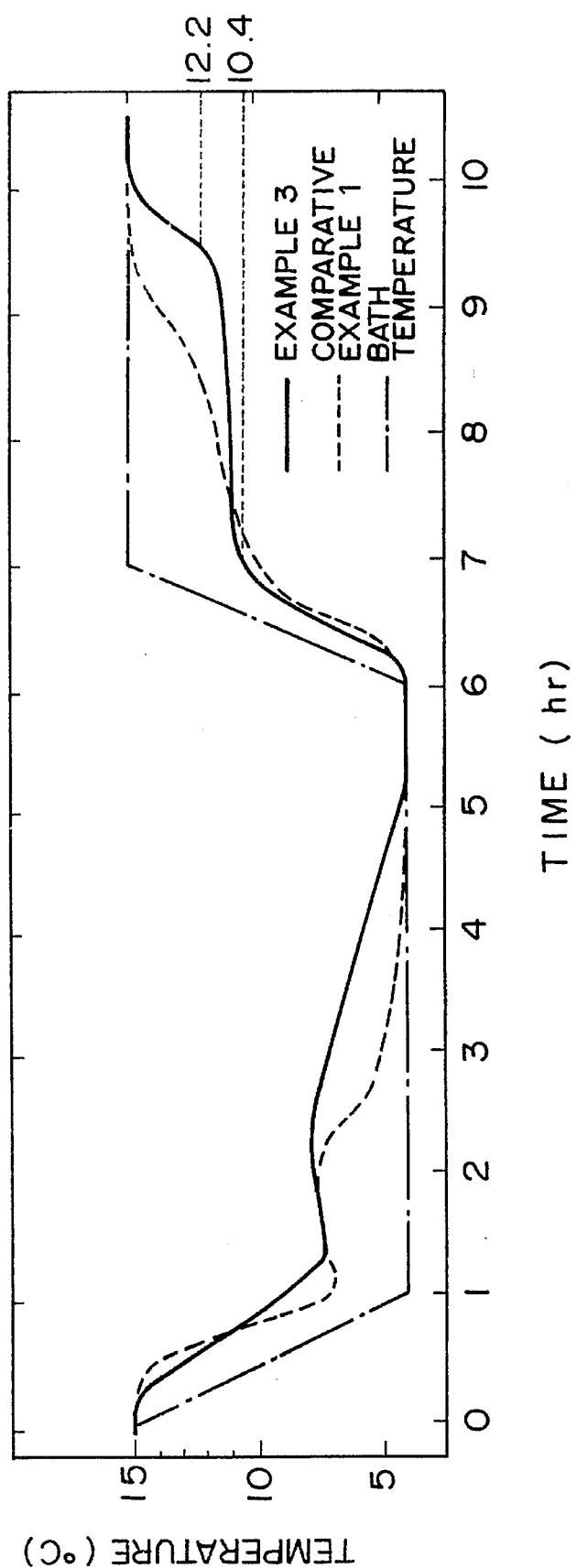
FIG. 1 is a graph showing the freezing/melting heat patterns of the latent heat storage material compositions prepared in Example 3 and Comparative Example 1.

According to the present invention, a latent heat storage material composition comprising 70 to 90 wt % of sodium sulfate decahydrate, 3 to 17 wt % of ammonium chloride, 1 to 13 wt % of sodium chloride and 1 to 13 wt % of ammonium sulfate are provided.

Another aspect of the present invention is to provide a latent heat storage material composition comprising 0.1 to 10 wt % of at least one type of nucleating agent selected from the group consisting of sodium tetraborate decahydrate, silicate and cryolite, and 0.1 to 10 wt % of at least one type of thickening agent selected from the group consisting of carboxymethyl cellulose, attapulgite clay and water-insoluble hydrogels.

The main component of the latent heat storage material composition according to the present invention is sodium sulfate decahydrate which has a melting point of 32.5° C. and latent heat of melting of about 60 cal/g. In the composition of the present invention, ammonium chloride, sodium chloride and ammonium sulfate are blended with said sodium sulfate decahydrate as melting point controlling agents, in order to obtain a latent heat storage material composition having a melting point of within a range of 10° to 13° C.

The content of sodium sulfate decahydrate in the composition of the present invention is 70 to 90 wt %, and preferably 75 to 85 wt %. If the content is over 90 wt %, the blending amount of said melting point controlling agents becomes small, resulting in failure to lower the melting point of the composition to the range of 10° to 13° C. On the other hand, if the content is less than 70 wt %, the latent heat of melting becomes small, which is not preferable for the composition of the present invention.

The total content of the melting point controlling agents is 10 to 30 wt %, and preferably 15 to 25 wt %. Among the melting point controlling agents, ammonium chloride which acts most effectively is contained in an amount of between 3 to 17 wt %, and preferably between 5 to 12 wt % based on the total weight of the composition. If the content of ammonium chloride is not within this range, the resulting composition can not achieve a melting point in the range of 10° to 13° C.

Sodium chloride can lower the melting point of the latent heat storage material composition composed mainly of sodium sulfate decahydrate to about 13° C., by combining with ammonium chloride. The content of said sodium chloride is in the range of 1 to 13 wt %, and preferably between 4 to 10 wt %, which is the same as or lower than the content of ammonium chloride.

The effect of ammonium sulfate as a melting point controlling agent is weak compared to that of ammonium chloride and sodium chloride. However, it is found that the composition resulting from the addition of ammonium sulfate has an increased latent heat and is stable in behavior change during melting, probably due to the increase in ammonium ions and sulfate ions in the composition. The blending amount of ammonium sulfate is 1 to 13 wt %, preferably 4 to 10 wt %, and more preferably is an amount which is the same or less than that of ammonium chloride. If the total content of sodium chloride and ammonium sulfate is less than 1 wt % or over 13 wt %, the resulting composition can not achieve a melting point in the range of 10° to 13° C.

The latent heat storage material composition of the present invention comprises sodium sulfate decahydrate, ammonium chloride, sodium chloride and ammonium sulfate as essential components, but may further contain a nucleating agent and a thickening agent.

Examples of the nucleating agent to be used in the present invention include sodium tetraborate decahydrate, silicates, cryolite and so on. Of these, sodium tetraborate decahydrate is most preferable. The blending amount of the nucleating agent is 0.1 to 10 wt %, and preferably 0.5 to 5 wt % based on the resulting composition weight.

Examples of the thickening agent to be used in the present invention include carboxymethyl cellulose, attapulgite clay, water-insoluble hydrogels, sodium alginate, gelatin, agar, wood pulp, silica gel, diatomaceous earth, and so on. Of these, carboxymethyl cellulose, attapulgite clay, water-insoluble hydrogels such as a poly acrylate and a partially saponificated vinyl acetate/acrylic acid copolymer or a starch/acrylic acid graft copolymer are preferable. The blending amount of the thickening agent is 0.1 to 10 wt %, and preferably 0.5 to 5 wt % based on the resulting composition weight. Through the use of the thickening agent a latent heat storage material composition exhibiting stable long-term performance can be obtained.

The characteristic of the present invention exists in that the latent heat storage material composition comprises sodium sulfate decahydrate, ammonium chloride, sodium chloride and ammonium sulfate in a specific blending ratio. The effects of the present invention cannot be obtained if even one component among said components is lacking or if a blending ratio which is outside of said specific blending ratio is used.

As the water-insoluble hydrogel, a poly acrylate, a partially saponificated vinyl acetate/acrylic acid copolymer, a starch/acrylic acid graft copolymer, etc., can be used.

EXAMPLES

Examples 1 to 13

Method for Preparation of Latent Heat Storage Material Compositions and Thermal Evaluation Thereof Sodium sulfate decahydrate, ammonium chloride, sodium chloride and ammonium chloride were blended in the ratios shown in Table 1, followed by the further addition of sodium tetraborate decahydrate as a nucleating agent and a water-insoluble hydrogel (Sunwet M-1000: trade name, produced by Sanyo Chemical Industries, Ltd.) as a thickening agent, each in an amount of 1.5 parts by weight based on 100 parts by weight of the blended salts. The resulting mixture was agitated with a mixer to prepare the compositions. At this time, it is very important to agitate the mixture sufficiently to form a homogeneous composition. If the mixture is not sufficiently agitated, the desired quantity of latent heat cannot be obtained.

The latent heat was measured for each of the resulting compositions at the temperature range of −10° to 40° C. using DSC. The temperature changing pattern was also measured by introducing 40 cc of each resulting composition into a 85-cc centrifugal sediment tube, then inserting a thermocouple in the center thereof, sealing the tube with a rubber plug, putting the sealed tube in a water bath, and finally subjecting this to freezing/melting recycling at between 5° C. and 15° C. The crystallizing point at freezing, freezing point and average melting point were also measured for each resulting composition. The results are shown in Table 1. Crystallizing point refers to the temperature where the metastable state is broken and crystallization occurs, and the average melting point refers to the average temperature between the melting starting point and end point. Freezing point refers to the maximum temperature that is reached by dissipating the latent heat as the metastable state is broken and the composition is frozen. The results are also shown in Table 1.

Comparative Examples 1 to 3

Three compositions were prepared in the same manner as the Examples described above. Thermal evaluation was carried out for each composition. The results are shown in Table 1.

TABLE 1

|  | Example No. | | | |
|---|---|---|---|---|
|  | 1 | 2 | 3 | 4 |
| Composition (wt %) | | | | |
| $Na_2SO_4 \cdot 10H_2O$ | 80 | 80 | 80 | 80 |
| $NH_4Cl$ | 5 | 10 | 10 | 10 |
| $NaCl$ | 5 | 2 | 4 | 6 |
| $(NH_4)_2SO_4$ | 10 | 8 | 6 | 4 |
| Properties | | | | |
| Quantity of latent heat of melting (cal/g) | 47.3 | 33.7 | 30.1 | 35.9 |
| Crystallizing point (°C.) | 6.7 | 6.9 | 6.2 | 6.7 |
| Freezing point (°C.) | 7.2 | 8.8 | 6.5 | 7.4 |
| Average melting point (°C.) | 11.9 | 11.6 | 11.3 | 12.4 |

|  | Example No. | | | |
|---|---|---|---|---|
|  | 5 | 6 | 7 | 8 |
| Composition (wt %) | | | | |
| $Na_2SO_4 \cdot 10H_2O$ | 80 | 80 | 78 | 76 |
| $NH_4Cl$ | 10 | 12 | 5 | 12 |
| $NaCl$ | 8 | 4 | 5 | 4 |
| $(NH_4)_2SO_4$ | 2 | 4 | 12 | 8 |
| Properties | | | | |
| Quantity of latent heat of melting (cal/g) | 46.6 | 42.7 | 41.3 | 32.4 |
| Crystallizing point (°C.) | 7.0 | 6.2 | 6.7 | 6.5 |

TABLE 1-continued

| Freezing point (°C.) | 7.6 | 8.4 | 7.2 | 8.6 |
| Average melting point (°C.) | 12.1 | 11.5 | 11.9 | 11.6 |

| | Example No. | | | | |
| --- | --- | --- | --- | --- | --- |
| | 9 | 10 | 11 | 12 | 13 |
| Composition (wt %) | | | | | |
| $Na_2SO_4 \cdot 10H_2O$ | 76 | 80 | 80 | 76 | 77 |
| $NH_4Cl$ | 12 | 16 | 2 | 4 | 3 |
| NaCl | 8 | 2 | 9 | 10 | 10 |
| $(NH_4)_2SO_4$ | 4 | 2 | 9 | 10 | 10 |
| Properties | | | | | |
| Quantity of latent heat of melting (cal/g) | 47.0 | 37.3 | 42.9 | 46.4 | 36.3 |
| Crystallizing point (°C.) | 6.5 | 6.7 | 5.0 | 7.5 | 5.1 |
| Freezing point (°C.) | 8.0 | 9.0 | 7.5 | 7.5 | 5.6 |
| Average melting point (°C.) | 11.4 | 11.2 | 11.1 | 11.2 | 11.3 |

| | Comparative Example No. | | |
| --- | --- | --- | --- |
| | 1 | 2 | 3 |
| Composition (wt %) | | | |
| $Na_2SO_4 \cdot 10H_2O$ | 80 | 80 | 76 |
| $NH_4Cl$ | 12 | 14 | 5 |
| NaCl | 8 | 6 | 5 |
| $(NH_4)_2SO_4$ | — | — | 14 |
| Properties | | | |
| Quantity of latent heat of melting (cal/g) | 21.5 | 23.9 | — |
| Crystallizing point (°C.) | 5.5 | 5.8 | — |
| Freezing point (°C.) | 5.6 | 6.2 | — |
| Average melting point (°C.) | 12.6 | 13.1 | — |

From the results, it was found that each composition for Examples 1 to 13, in which the blending ratio of sodium sulfate decahydrate, sodium chloride, ammonium chloride and ammonium sulfate was within the range described in claim 1, showed an average melting point in the range of 10° to 13° C., which is the desired temperature. The compositions of the Examples other than Example 4 (which had an average melting point of 12.4° C.) were compositions possessing a low average melting point (i.e. 11.8° C. or below). Therefore, these compositions were found to be suitable for air conditioning systems in which the heat-extraction temperature is low. The composition of Example 4 had a melting point of 12.4° C. which is somewhat higher than those of the other compositions, but it showed much higher and superior heat storage properties (i.e. 35.9 cal/g) than the other compositions. The lowest latent heat of melting among those of the compositions of the Examples was 30.1 cal/g, which is converted to 45.2 cal/cm³ based on volume (calculated on the basis of the density of the composition being 1.50), and was about half of the latent heat of melting of ice. Accordingly, even the composition showing the lowest latent heat of melting is an excellent latent heat storage material.

On the other hand, the compositions of Comparative Examples 1 and 2 were ternary compositions of sodium sulfate decahydrate, ammonium chloride and sodium chloride based on the prior arts described above. The composition of Comparative Example 1 had an average melting point of 12.6° C. which is within the desired temperature range, but which is higher than any of those of the compositions of the Examples. Furthermore, the composition showed a small latent heat of melting of as low as 21.5 cal/g which is smaller than any those of the compositions of the Examples. The latent heat difference between the compositions of Example 3 and Comparative Example 1 was relatively small. However, when comparing the average melting points, the composition of Comparative Example 1 had an average melting point (12.6° C.) which is higher than the composition of Example 3 (11.7° C.) by about 1° C. From the above, it was found that the composition of Example 6 had a larger, effective latent heat employable at a low temperature than the composition of Comparative Example 1.

The composition of Comparative Example 2 showed a high average melting point (13.1° C.) which is outside of the desired temperature range. It is preferable for a latent heat storage material composition to have an average melting point as near 10° C. as possible, if used for air conditioning systems. In this case, the effective heat usable for air conditioning is assumed to be very small, as the composition has a high melting point and a latent heat of melting of 23.9 cal/g.

When a latent heat storage material composition is intended to be used in a latent heat system, it is desirable that the difference between its average melting point and its freezing point is slight. That is, when melted at the same temperature, a composition having a higher freezing point tends to freeze more easily and is able to store heat more efficiently. The difference between freezing point and average melting point is no more than about 5° C. in the compositions of Examples 1 to 12 and 5.7° C. in the compositions of Example 13. On the other hand, in the compositions of Comparative Examples 1 and 2, the difference between freezing point and average melting point is about 7° C. (i.e. 7.0° C. in Co. Ex. 1 and 6.9° C. in Co. Ex. 2). The difference between the compositions of the Examples and those of the Comparative Examples was about 2° C. Therefore, it was found that the compositions of the Examples can store heat more effectively.

The composition of Comparative Example 3 was a composition containing ammonium sulfate in an amount outside of the range of 1 to 13 wt %. On being measured by DSC, it was found to be a binary component which showed two melting peaks, at 15° C. and 20° C., and, therefore, this composition did not have a clear melting point. Further, the two melting peaks (or points) which it did exhibit were higher than the desired temperature range, making it impossible to use for air conditioning purposes.

Test for Long-term Stability of Latent Heat Storage Materials

In order to reproduce actual conditions, the samples of Example 3 and Comparative Example 1 were charged in a resin-made ball (diameter: 77 mm) in an amount of 260 g, and the temperature change at the ball center was measured and recorded by using a thermocouple. Next, the water bath containing the ball was cooled from 15° C. to 4° C. over a one hour span and retained at 4° C. for five hours. Subsequently, the water bath was warmed from 4° C. to 15° C. over a one hour span and retained at 15° C. for five hours. This freezing/melting heat cycle was repeated 100 times and the freezing/melting heat pattern of each sample after the cycle is shown in FIG. 1.

From FIG. 1, the following results and considerations are given.

That is, in FIG. 1, the period between hour 0 and hour 6 is the period in which the freezing process occurs. During this process, the water bath was cooled to 4° C. over one hour, and maintained at 4° C. for five hours. Both the composition of Example 3 and Comparative Example 1 were subjected to a decreasing temperature until one hour from the start without any change of state. At the one hour point, the metastable supercooling state of each sample was broken and crystallization began. From this point in order to release the latent heat of freezing, both samples were subjected to an increasing temperature and the crystallization proceeded. The temperature of the samples became equal to that of the water bath, in about five hours in the sample of Example 3, and in about four and a half hours in the sample of Comparative Example 1, after releasing the latent heat of freezing to finish the crystallization.

In FIG. 1, the period between hour 6 and hour 11 is the period in which the melting process occurs. During the hour between hour 6 and hour 7, the water bath was warmed to 15° C. and maintained at 15° C. for four hours. In the composition of Example 3, the temperature of the composition increased from the starting point until one hour had passed without any change of state, and then at that point after which a total of seven hours had passed melting began and continued until hour 9.5. Once the melting had finished, the temperature of the sample became equal to that of the water bath. Over this period, the sample of Example 3 melted at from 10.4° to 12.2° C. and the melting curve extended parallel to the time axis at temperatures near the melting point (from hour 7 until hour 9.5), which suggests that the composition stably released large amounts of stored heat as latent heat of melting. When the stored heat of the sample given after repeating the freezing/melting heat cycle 100 times was measured using DSC, the stored heat had decreased from 30.1 cal/g to 26.5 cal/g which is, however, still a large amount of stored heat. The stored heat in the composition of Example 3 thus decreased by 12% compared to the initial value.

On the other hand, the composition of Comparative Example 1, similar to the composition of Example 3, continued to increase in temperature from the starting point until one hour had passed without any change of state, and the melting curve began to slope parallel to the time axis from the point near hour 7. However, the curve never became completely parallel to the time axis completely as in the composition of Example 3. Rather, the temperature of the sample increased linearly until nine hours had passed, and thereafter it became equal to the temperature of the water bath. That is, the melting curve of the composition of Comparative Example 1 never become parallel to the time axis or the composition of Example 3 did, which suggests that the composition of Comparative Example 1 is a composition not having a clear melting point. Generally, a latent heat storage material not having a clear melting point faces difficulties in the stable extraction of heat in a system and makes control of the system troublesome and, therefore, is difficult to use, even if it contains sufficient heat therein. After repeating the freezing/melting heat cycle 100 times, the stored heat in the composition of Comparative Example 1 decreased from 21.5 cal/g to 17.6 cal/g, a decrease ratio of 18%.

The composition of Example 3 was found to have a stable melting temperature even after 100 repetitions of the freezing/melting heat cycle and was further found a stable composition during long-term use. This is probably due to the ammonium sulfate contained therein. In addition, the composition of Example 3 was also found to be thermally stable, since the decrease ratio of latent heat (i.e. 12%) is smaller than that of the composition of Comparative Example 1 (i.e. 18%).

According to the present invention, by blending sodium sulfate decahydrate and a melting point controlling agent in a specific blending ratio, there can be provided a latent heat storage material composition that can be frozen with cooled water of 4° to 5° C., having a melting point of 10° C. to 13° C., having large latent heat of melting at the melting point, and exhibiting excellent long-term performance.

What is claimed is:

1. A latent heat storage material composition consisting essentially of 70 to 90 wt % of sodium sulfate decahydrate, 3 to 17 wt % of ammonium chloride, 1 to 13 wt % of sodium chloride and 1 to 13 wt % of ammonium sulfate, said composition having a melting point in the range of 10° to 13° C. and a latent heat of melting of 30.1 to 47.3 cal/g.

2. A composition according to claim 1, consisting essentially of 75 to 85 wt % of sodium sulfate decahydrate, 5 to 12 wt % of ammonium chloride, 4 to 10 wt % of sodium chloride and 4 to 10 wt % of ammonium sulfate.

3. A latent heat storage material composition consisting essentially of 70 to 90 wt % of sodium sulfate decahydrate, 3 to 17 wt % of ammonium chloride, 1 to 13 wt % of sodium chloride, 1 to 13 wt % of ammonium sulfate, 0.1 to 10 wt % of at least one nucleating agent selected from the group consisting of sodium tetraborate decahydrate, silicates and cryolite, and 0.1 to 10 wt % of at least one of a thickening agent selected from the group consisting of carboxymethyl cellulose, attapulgite clay and water-insoluble hydrogels, said composition having a melting point in the range of 10° to 13° C. and a latent heat of melting of 30.1 to 47.3 cal/g.

4. A composition according to claim 3, wherein the nucleating agent is sodium tetraborate decahydrate.

5. A composition according to claim 3, wherein the thickening agent is a water-insoluble hydrogel.

* * * * *